(12) United States Patent
Butterworth

(10) Patent No.: US 7,400,350 B2
(45) Date of Patent: Jul. 15, 2008

(54) SYSTEM AND METHOD FOR COLLECTING IMAGES OF A MONITORED DEVICE

(75) Inventor: Mark Melvin Butterworth, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 618 days.

(21) Appl. No.: 11/031,747

(22) Filed: Jan. 7, 2005

(65) Prior Publication Data

US 2006/0153458 A1 Jul. 13, 2006

(51) Int. Cl.
*H04N 5/262* (2006.01)
*H04N 5/762* (2006.01)

(52) U.S. Cl. .................... 348/239; 348/231.99

(58) Field of Classification Search .......... 348/143, 348/160, 231.99, 239; 340/870.02
See application file for complete search history.

(56) References Cited

U.S. PATENT DOCUMENTS

| | | | | |
|---|---|---|---|---|
| 5,016,025 A | * | 5/1991 | Wyss | 346/14 MR |
| 5,870,140 A | * | 2/1999 | Gillberry | 348/160 |
| 6,801,865 B2 | | 10/2004 | Gilgenbach et al. | |
| 6,956,500 B1 | * | 10/2005 | Ducharme et al. | 340/870.02 |
| 6,985,173 B2 | * | 1/2006 | Shan et al. | 348/160 |

OTHER PUBLICATIONS

"Application of Image Monitoring Technique in Remote Monitoring System for Insulators", Min Li, Wei Cai, and Zheng Tan, Proceedings of the 5th World Congress on Intelligent Control and Automation, Jun. 15-19, 2004, Hangzhou, P. R. China.*

* cited by examiner

*Primary Examiner*—Tuan Ho
*Assistant Examiner*—Dennis Hogue
(74) *Attorney, Agent, or Firm*—RatnerPrestia

(57) ABSTRACT

A system and method for collecting images of monitored devices, such as utility meters for electricity, gas and water, captures a digital image of a monitored device and produces a difference digital image from the digital image using a reference digital image of the monitored device. The difference digital image has pixel values derived from differences between corresponding pixel values of the digital image and the reference digital image. The difference digital image is smaller in data size than the original digital image. The original digital image can be reconstructed from the difference digital image using the reference digital image.

19 Claims, 6 Drawing Sheets

SYSTEM AND METHOD FOR COLLECTING IMAGES OF A MONITORED DEVICE

BACKGROUND OF THE INVENTION

Utility meters are used to keep track of electricity, gas and water usages for individual residential and business premises. The amount of electricity, gas and water consumed by a residential or business consumer over a predefined period of time can be determined by reading the associated utility meters at the end of that time period. As an example, the amount of electricity and gas consumed by a customer over a particular month can be determined by reading the electric and gas meters at the end of that particular month. The meter readings are used to compute the electric, gas and water bills for the predefined period of time.

The traditional method for obtaining these meter readings at the end of each predefined period of time involves visually reading the meters in person for each customer and recording the meter readings on paper or on an electronic device. The recorded meter readings are then processed to generate utility bills, which are mailed to the customers.

A concern with the traditional method for obtaining meter readings is that a large number of meter readers is needed to visually read each utility meter in person at the end of a predefined period of time. In addition, since the utility meters are personally read and the meters readings are manually entered on paper or on an electronic device, the method introduces potential human errors, which would create discrepancies between the actual consumption of electricity, gas or water for a predefined period of time and the associated bill. Furthermore, the method does not provide any record of the actual meter readings, except for the manually entered meter readings, which could be used in evaluating performances of meter readers or in verifying certain utility bills.

In order to partly alleviate these concerns, Automated Meter Reading (AMR) technologies have been developed to automate the method for obtaining meter readings at the end of each predefined period of time. An AMR technology employs a meter interface unit, which automatically extracts meter information and transmits the meter information to a data collection device. The meter interface unit may be attached to an existing utility meter or integrated into a new utility meter. In one type of AMR systems, the data collection device may be mounted on a vehicle or carried by a meter reader so that the data collection device can be moved into the transmission range for a particular utility meter with the meter interface unit to receive wirelessly transmitted meter information. In another type of AMR systems, the data collection device may be located at a centralized facility, where the meter information from different meters are received via a communication network, which may be wireless.

Although the AMR systems alleviate some of the concerns of the traditional method for obtaining meter readings, the AMR systems also do not provide any record of the actual meter readings, except for the information provided by the meter interface units.

In view of this concern, there is a need for a system and method for collecting meter readings in a way that provides physical record of the actual meter reading.

SUMMARY OF THE INVENTION

A system and method for collecting images of monitored devices, such as utility meters for electricity, gas and water, captures a digital image of a monitored device and produces a difference digital image from the digital image using a reference digital image of the monitored device. The difference digital image has pixel values derived from differences between corresponding pixel values of the digital image and the reference digital image. The difference digital image is smaller in data size than the original digital image, which makes it more convenient for storage and transfer. The original digital image can be reconstructed from the difference digital image using the reference digital image.

A system for collecting images of a monitored device in accordance with an embodiment of the invention comprises an image acquisition unit positioned to acquire digital images of the monitored device. The image acquisition unit comprises an image sensor, a processor and a data storage device. The image sensor is configured to electronically capture a digital image of the monitored device. The processor is operatively coupled to the image sensor. The processor is configured to process the digital image with a reference digital image of the monitored device to produce a difference digital image. The difference digital image has pixel values derived from differences between corresponding pixel values of the digital image and the reference digital image. The data storage device is used to store the difference digital image A method for collecting images of a monitored device in accordance with an embodiment of the invention comprises electronically capturing a digital image of the monitored device at a first site, processing the digital image at the first site using a reference digital image of the monitored device to produce a difference digital image, including taking differences between corresponding pixel values of the digital image and the reference digital image to derive pixel values of the difference digital image, storing the difference digital image at the first site, and transferring the difference digital image from the first site to a second site for processing.

Other aspects and advantages of the present invention will become apparent from the following detailed description, taken in conjunction with the accompanying drawings, illustrated by way of example of the principles of the invention.

DETAILED DESCRIPTION

Figure 1:
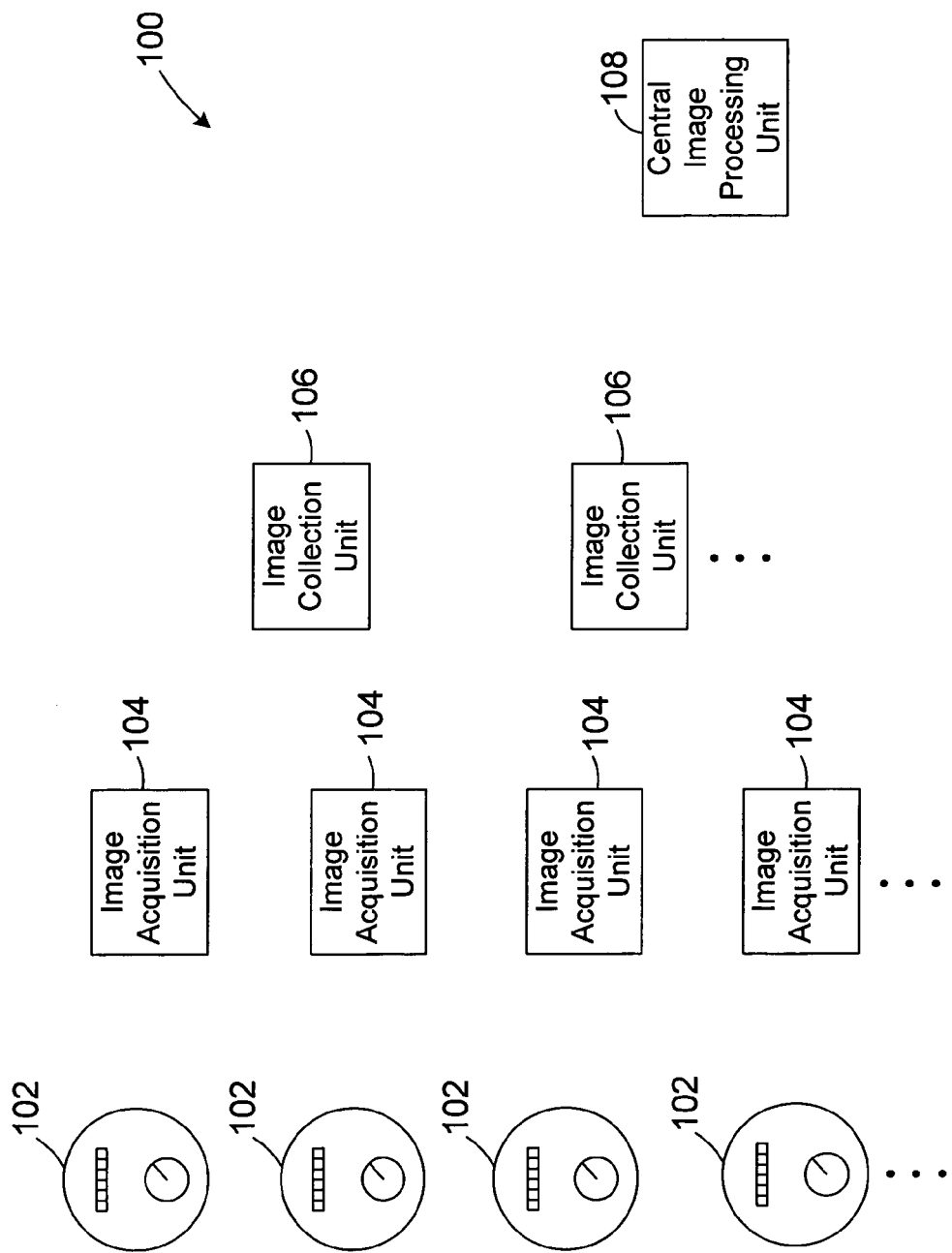
FIG. 1 is a block diagram of a system for collecting images of monitored devices, such as utility meters, in accordance with an embodiment of the invention.

With reference to FIG. 1, a system 100 for collecting images of monitored devices 102, such as utility meters for electricity, gas and water, in accordance with an embodiment of the invention is described. The system 100 can be used to acquire meter readings in the form of digital images, which serves as a record of the actual meter readings. The meter reading images can be processed to extract meter information from the images. The extracted meter information can then be used to generate bills for the consumed commodity, such as electricity, gas or water. As described in detail below, the system 100 utilizes a technique to reduce the data size of the acquired images to reduce the amount of data being stored and transferred within the system.

As shown in FIG. 1, the system 100 includes a number of image acquisition units 104, a number of image collection units 106 and a central image processing unit 108. Each image acquisition unit 104 is positioned at the site of a monitored device 102 in close proximity to the monitored device. Each image acquisition unit 104 operates to periodically capture a digital image of the respective monitored device 102 and locally store the captured images. As described in more detail below, some of the captured digital images are processed to reduce the data size of the digital images by producing "difference digital images" using a reference digital image of a monitored device. A difference digital image is a digital image produced by taking the differences between corresponding pixel values of a reference digital image and a digital image of interest. Thus, each pixel value of the difference image is the difference between a corresponding pixel value of the reference digital image and a corresponding pixel value of the digital image of interest. The digital images are then compressed using a compression technique, which further reduces the data size of the stored digital images. When requested, the stored digital images are transmitted to one of the image collection devices 106 to be transferred to the central image processing unit 108 for processing.

Figure 2:
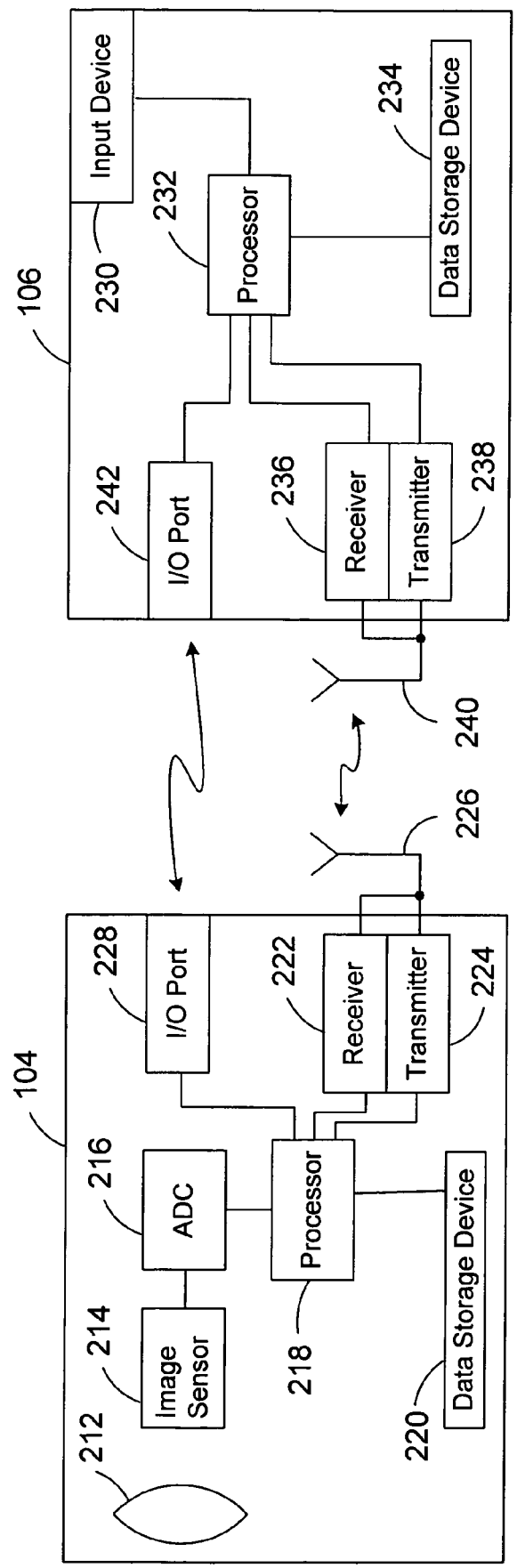
FIG. 2 is a block diagram of an image acquisition unit and an image collection unit of the system of FIG. 1 in accordance with an embodiment of the invention.

FIG. 2 shows the components of one of the image acquisition units 104 in accordance with an embodiment of the invention. The image acquisition unit 104 includes a lens 212, an image sensor 214, an analog-to-digital converter (ADC)-216, a processor 218 and a data storage device 220. The lens 212 is used to focus the monitored device 102 associated with this particular image acquisition unit 104 onto the image sensor 214. The image sensor 214 operates to electronically capture the monitored device 102 as electrical analog signals. Each electrical analog signal represents the intensity of light impinged on a particular photosensitive pixel of the image sensor 214. The image sensor 214 may be a grayscale image sensor or a color image sensor. If the image sensor 214 is a color image sensor, the image sensor produces a mosaiced image of the monitored device 102 using a color filter (not shown). A mosaiced image is an electronic image in which each pixel of the image is one of primary colors, such as red, green and blue. The mosaiced image can be subsequently demosaiced to produce a color image. As an example, the image sensor 214 may be a complementary metal oxide semiconductor (CMOS) sensor or a charged coupled device (CCD) sensor. The electrical analog signals generated by the image sensor 214 are converted to digital signals by the ADC 216 and transmitted to the processor 218 as a captured digital image of the monitored device 102.

The processor 218 of the image acquisition unit 104 operates to process the captured images of the monitored device 102 and store the images in the data storage device 220, which may be any type of a data storage device, such as a hard disk drive or a flash memory. The processor 218 also controls various components of the image acquisition unit 104, and thus, controls the operation of the image acquisition unit The processor 218 may be any type of a digital signal processor. In an embodiment, the processor 218 is configured to selectively produce difference digital images from the captured digital images of the monitored device 102 using a reference digital image. A difference digital image of a captured digital image is a digital image in which each pixel value is derived from a difference between corresponding pixel values of the captured digital image and the reference digital image. The reference digital image is a digital image of the monitored device 102, which may have been previously captured. Since visual differences between the reference digital image and a subsequently captured digital image will be minor, many of the pixel values of the difference digital image will be equal to zero. Thus, the data size of a difference digital image will be significantly smaller than a compatible digital image of the monitored device 102.

The processor 218 may also be configured to compress the difference digital image using a known compression standard. As an example, the difference digital image can be compressed using a MPG4 compression standard with run length encoding or Huffman encoding. As explained below, the original digital image can be subsequently reconstructed from the difference digital image using the reference digital image. If the image sensor 214 is a color image sensor, the processor 218 may also be configured to demosaic the captured digital image to produce a demosaiced image, which is then used to produce a difference digital image.

In this embodiment, the image acquisition unit 104 further includes a wireless receiver 222, a wireless transmitter 224 and an antenna 226, as shown in FIG. 2. The receiver 222 and transmitter 224 are both connected to the processor 218 and the antenna 226 to wirelessly receive and transmit data between the image acquisition unit 104 and one of the image collection units 106. As an example, the receiver 222 and the transmitter 224 may operate in the radio frequency (RF) range. The image acquisition unit 104 may also include an input/output (I/O) port 228 to receive and transmit data using a wire connection between the image acquisition unit 104 and one of the image collection units 106. Alternatively, the image acquisition unit 104 may include only the I/O port 228 or only the receiver 222, the transmitter 224 and the antenna 226. Although not shown in FIG. 2, the image acquisition unit 104 may have its own power supply, i.e., a battery. Alternatively, the image acquisition unit 104 may receive power from the monitored device 102.

Figure 3A:
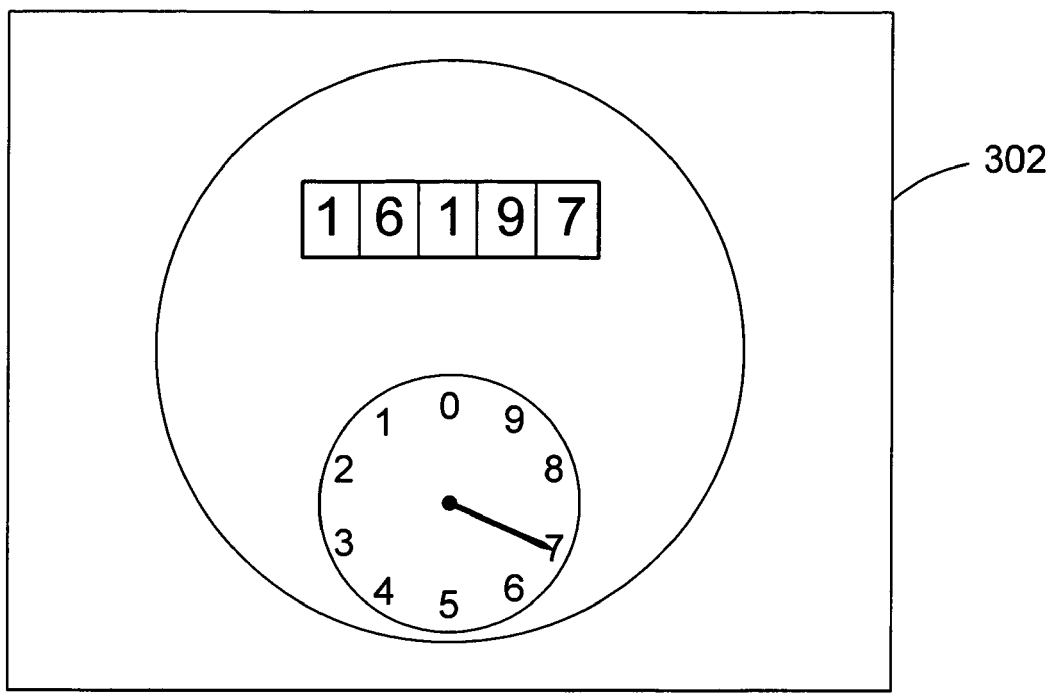
FIG. 3A is a reference digital image of an electric meter (a monitored image) in accordance with an embodiment of the invention.
Figure 3B:
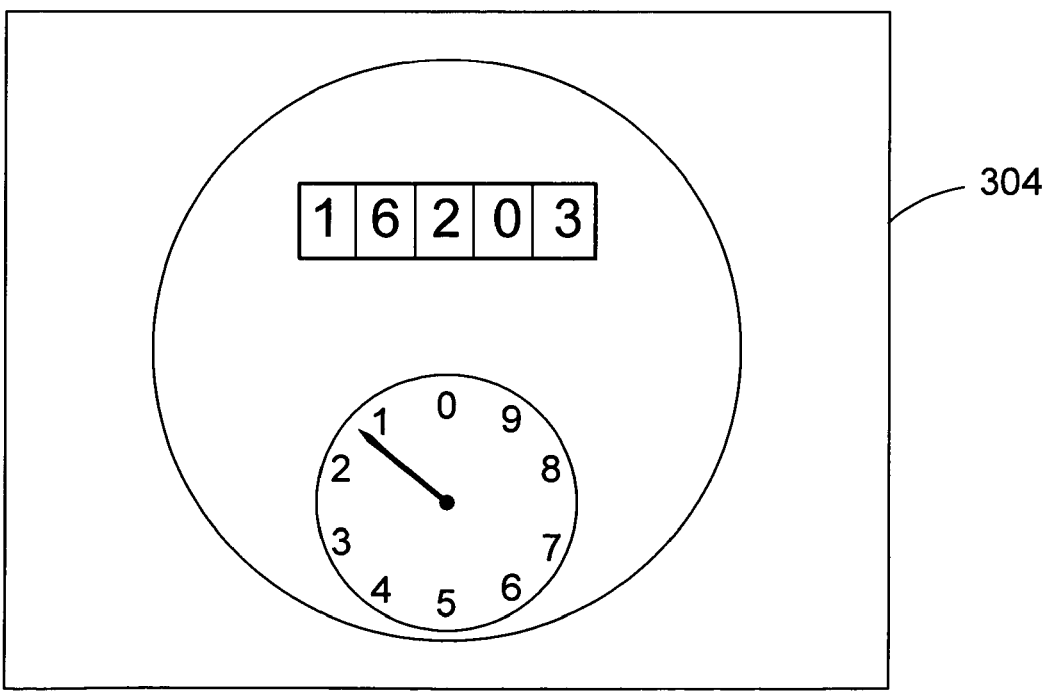
FIG. 3B is a captured digital image of the electric meter in accordance with an embodiment of the invention.
Figure 3C:
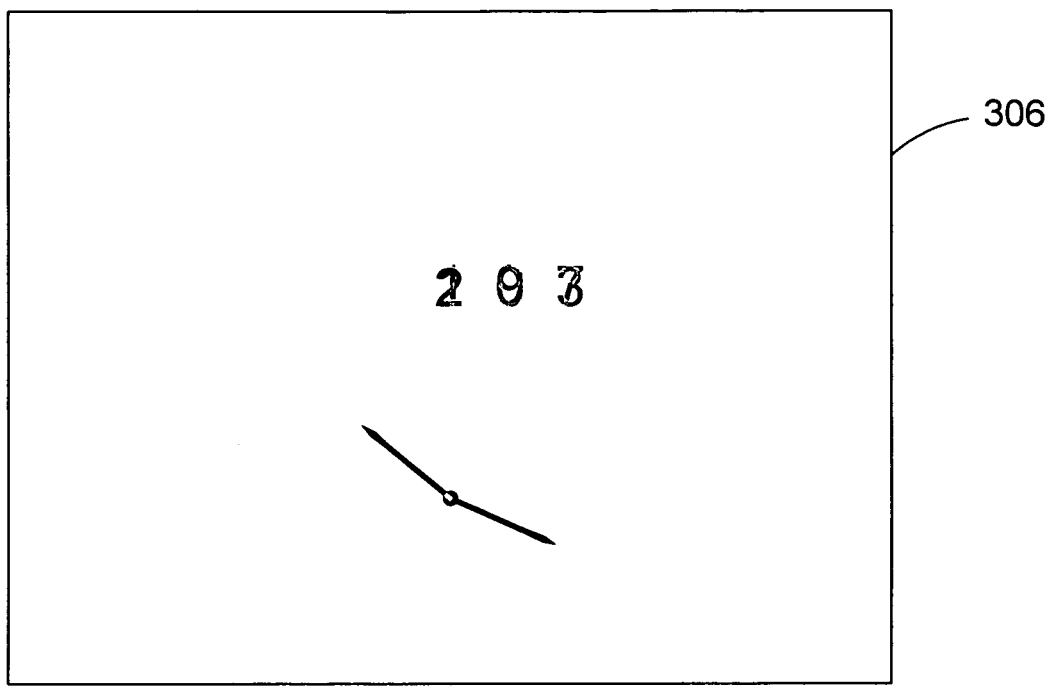
FIG. 3C is a difference digital image produced using the digital image of FIG. 3B and the reference digital image of FIG. 3A.

The process for producing difference digital images by the image acquisition unit 104 in accordance with an embodiment of the invention is described using an example of capturing a digital image of an electric meter, i.e., the monitored device, for each day of a given month. On the first day of the month, a digital image 302 of the electric meter is captured by the image acquisition device 104, as illustrated in FIG. 3A. This digital image 302 is used as the reference digital image for the given month for this particular electric meter. The reference digital image is stored in the data storage device 220 for subsequent use. On the second day of the month, another digital image 304 of the electric meter is captured, as illustrated in FIG. 3B. A difference digital image 306 is then derived from this second digital image 304 of the electric meter by subtracting the second digital image from the reference digital image 302, as illustrated in FIG. 3C. Specifically, pixel values of the second digital image 304 are subtracted from corresponding pixel values of the reference digital image 302 to derive the difference digital image 306. That is, a pixel value located at a particular location of the second digital image 304 is subtracted from the pixel value located at the same location of the reference digital image 302. Since there are many similarities between the reference digital image 302 and the second digital image 304, the difference digital image 306 will have many pixel values equal to zero, which reduces the data size of the difference digital image.

Figure 3D:
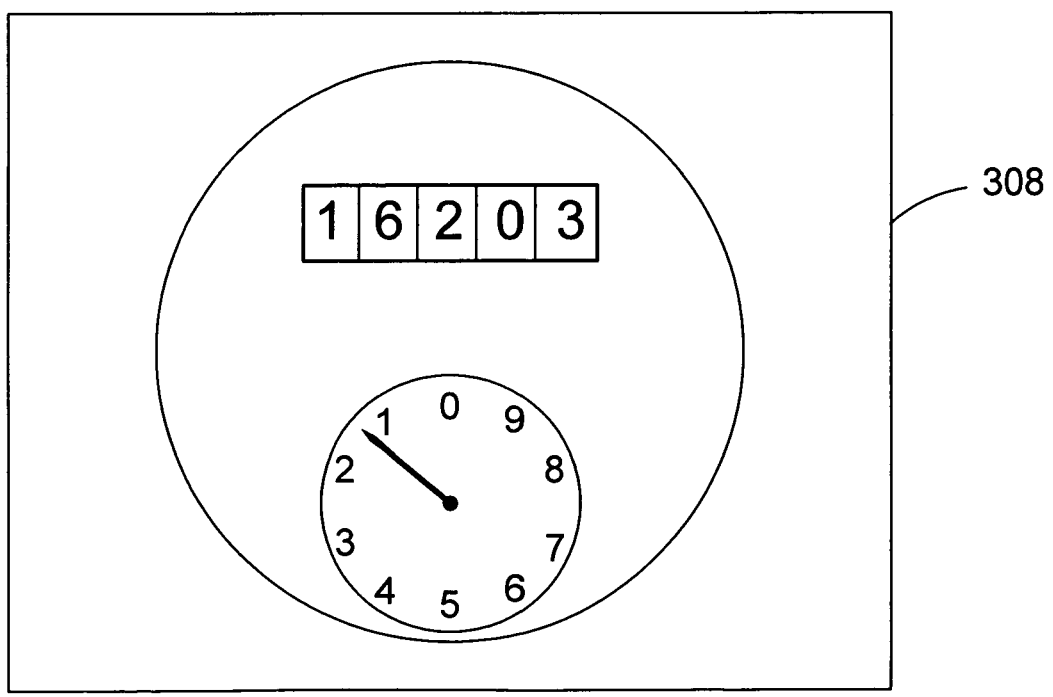
FIG. 3D is a reconstructed digital image of the digital image of FIG. 3B that was produced using the difference digital image of FIG. 3C and the reference digital image of FIG. 3A.

The original second digital image 304 can be reconstructed by subtracting the difference digital image 306 from the reference digital image 302, which is performed by the central image processing unit 108. That is, pixel values of the difference digital image 306 are subtracted from corresponding pixel values of the reference digital image 302 to derive a reconstructed image 308 of the second digital image 304, as illustrated in FIG. 3D. In the same manner, digital images of the electric meter captured on subsequent days of the given month are converted into difference digital images, which can then be used to reconstruct the original digital images.

FIG. 2 also shows the components of one of the image collection units 106 in accordance with an embodiment of the invention. The image collection unit 106 is used to retrieve the stored reference and difference digital images in one or more image acquisition units 104 of the system 100. The image collection unit 106 may be mounted onto a vehicle, which can be used to move the image collection unit 106 into the transmission range of one or more image acquisition units 104. Alternatively, the image collection unit 106 may be carried by a meter reader as a handheld device. After the stored digital images are retrieved from the image acquisition units 104, the digital images are transferred to the central image processing unit 108 for processing.

As shown in FIG. 2, the image collection unit 106 includes an input device 230, a processor 232, a data storage device 234, a wireless receiver 236, a wireless transmitter 238, an antenna 240 and an I/O port 242. The input device 230 is connected to the processor 232 and is used to enter commands into the image collection unit 106. The input device 230 may include keys, buttons, dials, levers, switches or other input mechanisms. The processor 232 and the data storage device 234 of the image collection device 106 may be similar to the processor 218 and the data storage device 220 of the image acquisition unit 104. However, the processor 232 can be any type of a digital signal processor, and the data storage device 234 can be any type of a storage device. The receiver 236 and the transmitter 238 are used to transmit control signals to one or more image acquisition units 104 and to receive digital images from those image acquisition units. In addition, the receiver 236 and the transmitter 238 are also used to receive and transmit control signals between the central image processing unit 108 and the image collection unit 106, and may be used to transmit the digital images to the central image processing unit 106. The I/O port 242 can be used to receive and transmit data using a wire connection between the image collection unit 106 and one of the image acquisition units 104 or between the image collection unit 106 and the central image processing unit 108. In an alternative embodiment, the image collection unit 106 may include only the I/O port 242 or only the receiver 236, the transmitter 238 and the antenna 240. Although not shown in FIG. 2, the image collection unit 106 may have its own power supply. Alternatively, the image collection unit 106 may receive power from an external source, such as the vehicle on which the image collection unit 106 is mounted.

Figure 4:
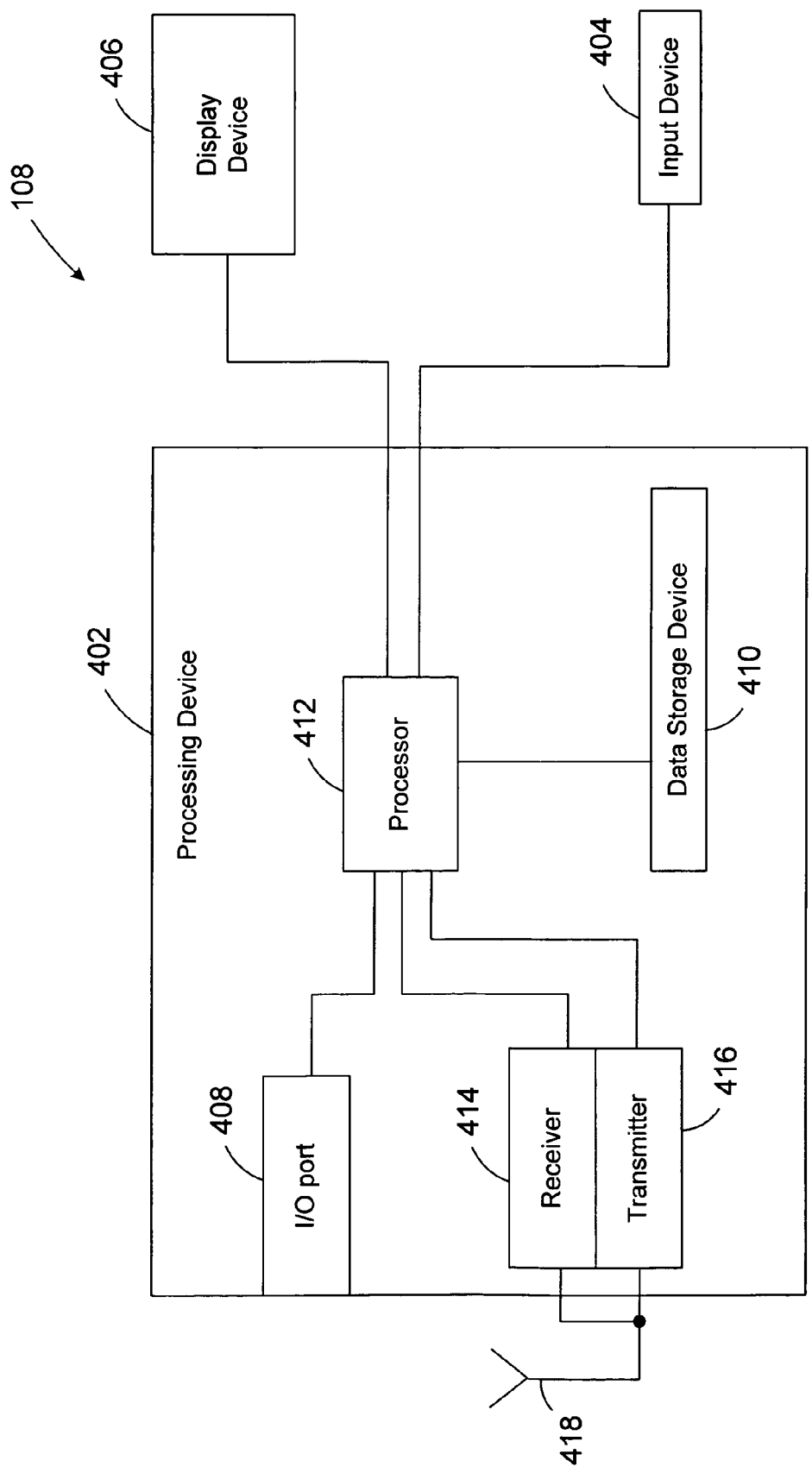
FIG. 4 is a block diagram of a central image processing unit of the system of FIG. 1 in accordance with an embodiment of the invention.

Turning now to FIG. 4, the components of the central image processing unit 108 in accordance with an embodiment is shown. The central image processing unit 108 operates to receive the digital images, i.e., the reference and difference digital images, from the image acquisition units 104 via the image collection units 106, and reconstruct the original captured images from the difference digital images using the respective reference signals. The visual information contained in the captured images can then be used to extract meter readings and to generate bills from the meter readings.

As shown in FIG. 4, the central image processing unit 108 includes a processing device 402, an input device 404 and a display device 406. The input device 404 allows an operator to input commands into the central image processing unit 108 to process the digital images received from one or more image collection units 106. The input device 404 may include a computer keyboard and a mouse. However, the input device 404 may include keys, buttons, dials, levers, switches or other input mechanisms integrated into the processing device 402. Alternative, the input device 404 may be integrated with the display device 406 as a touch-sensitive display. The display device 406 may be any type of a display device, such as those commonly found in personal computer systems, e.g., a CRT monitor or an LCD monitor. The display device 406 may also be integrated into the processing device 402.

The processing device 402 of the central image processing unit 108 includes an input/output (I/O) port 408, a storage device 410 and a processor 412. In order to simplify the figure, additional components that may be included in the processing device 402, which are commonly found in a typical computer system, are not shown or described herein. The I/O port 408 can be used to connect to one of the image collection units 106 using a wire connection to transfer the reference and difference digital images collected from one or more image acquisition units 104 to the central image processing unit 108. The transferred digital images are stored in the data storage device 410, which can be any type of a data storage device. The processor 412 is configured to process the transferred reference and difference digital images. In particular, the processor 412 is configured to reconstruct the original captured images from the difference digital images using the respective reference digital images. In a meter reading application, the meter readings shown in the reconstructed images and the reference digital images can then be extracted from the images. The extracted meter readings can be used to generate utility bills to send to the respective consumers.

The processing device 402 may also include a wireless receiver 414, a wireless transmitter 416 and an antenna 418. The receiver 414 and the transmitter 416 can be used to receive and transmit control signals and digital images between the central image processing unit 108 and one or more image collection units 106. In an alternative embodiment, the central image processing unit 108 may include only the I/O port 408 or only the receiver 414, the transmitter 416 and the antenna 418.

The operation of the system 100 in accordance with an embodiment is now described with reference to FIGS. 1, 2 and 4. In general, the system 100 operates to capture images of monitored devices 102, such as utility meters for electricity, gas and water, at predefined times during a predefined period of time. In this description, the predefined period of time is assumed to be a calendar month and the predefined times are assumed to be the days of this month. However, the system 100 may be configured to use other predefined times during other period of time.

On the first day of a given month, each image acquisition unit 104 captures a first digital image of the device 102 being monitored by that image acquisition unit using the image sensor 214 at the site of the monitored device. This digital image is used as a reference digital image for the given month. On the second day of the month, each image acquisition unit 104 captures a second digital image of the respective monitored device 102. The second digital image is then processed to produce a difference digital image for the second digital image. In particular, the difference digital image is produced by taking the difference between the second digital image and the reference digital image. That is, pixel values of the difference digital image are derived from the differences between corresponding pixels of the second digital image and the reference digital image. The difference digital image is then compressed using a known compression standard, such as a MPG4 compression standard, and stored in the data storage device 220. On each subsequent day of the month, this process of capturing a digital image of the monitored device 102, producing a difference digital image for that digital image, compressing the difference digital image and storing the compressed image is repeated. The reference digital image may also be compressed and stored in the data storage device 220.

After the difference digital images for each day of the month have been produced and stored, the stored images of the image acquisition units 104 are collected by one or more image collection units 106. This collection process may involve moving the image collection units 106 into the transmission range of one or more image acquisition units 104 to request transmission of stored images from the image acquisition units and then receiving the transmitted images using the respective receivers 222 and 236 and the respective transmitters 224 and 238. Alternatively, this collection process may involve making a wire connection between an image collection unit 106 and an image acquisition unit 104 using the respective I/O ports 228 and 242 to transfer the stored images.

Next, the stored images from the image acquisition units 104 are transferred to the central image processing unit 108, which is located at a predefined site, by the image collection units 106. The stored images include difference digital images and reference digital images from the image acquisition units 104. This transfer may involve using the respective receivers 236 and 414 and the respective transmitters 238 and 416 to wirelessly transmit the stored images from the image collection units 106 to the central image processing unit 108. Alternatively, this transfer may involve making a wire connection between an image collection unit 106 and the central image processing unit 108 to transfer the stored images.

The transferred images, which include difference digital images and reference digital images, are then processed by the processor 412 of the central image processing unit 108 to produce reconstructed digital images of the original digital image that have been converted to the difference digital images. If the transferred images were compressed at the image acquisition units 104, the transferred images are first decompressed. A reconstructed digital image is produced by taking the difference between a difference digital image and the associated reference digital image, i.e., the same reference digital image used to produce that difference digital image. The pixel values of the reconstructed digital image are derived from the differences between corresponding pixels of the difference digital image and the associated reference digital image. If the monitored devices 102 are utility meters, the reconstructed digital images and the reference digital images can be used to extract meter readings, which can then be used to generate utility bills to send to the customers associated with the utility meters.

Figure 5:
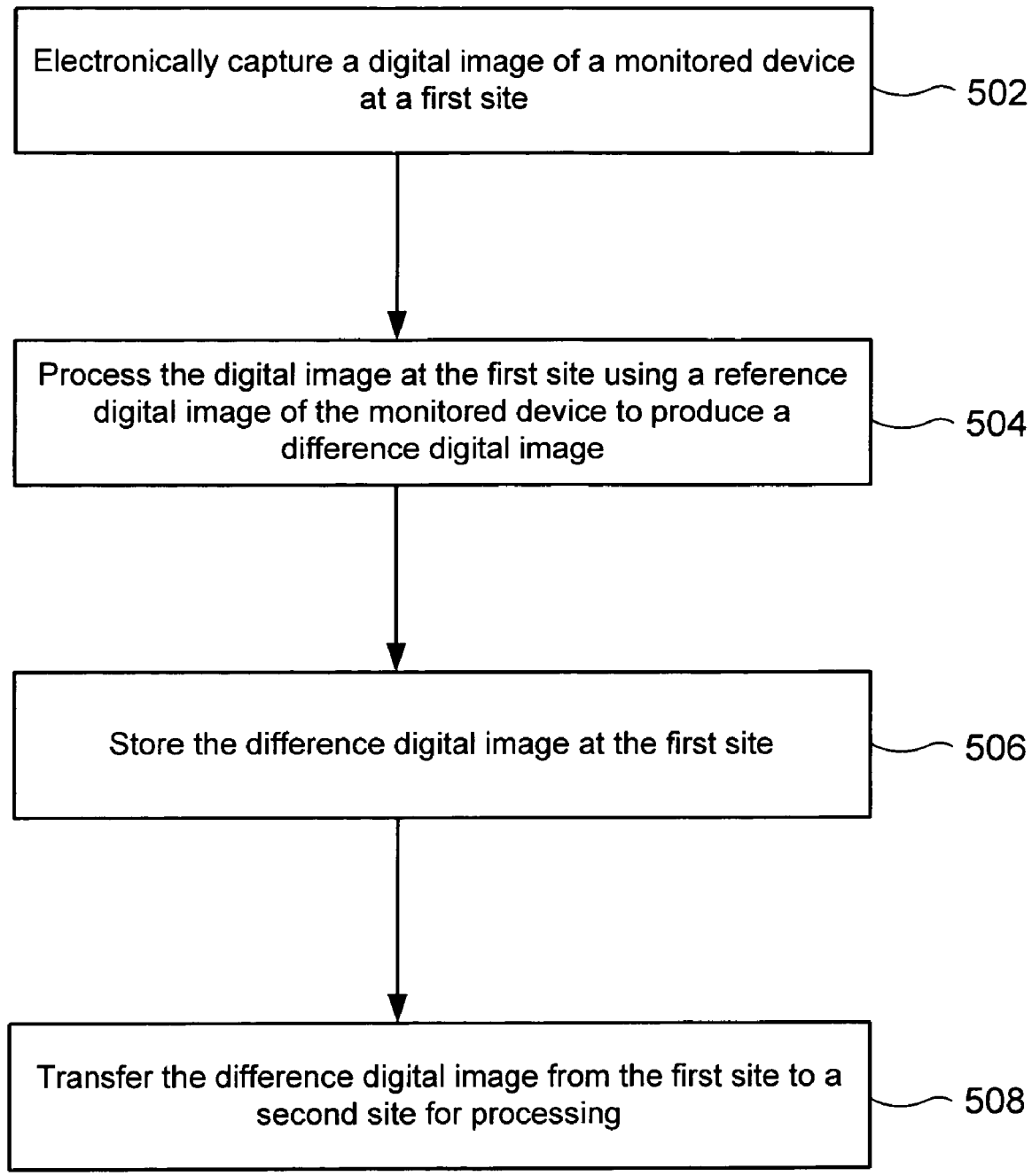
FIG. 5 is a process flow diagram of a method for collecting images of monitored devices in accordance with an embodiment of the invention.

A method for collecting images of monitored devices, such as utility meters, in accordance with an embodiment of the invention is described with reference to a process flow diagram of FIG. 5. At block 502, a digital image of a monitored device is electronically captured at a first site. Next, at block 504, the digital image is processed at the first site using a reference digital image of the monitored device to produce a difference digital image. This process includes taking the differences between corresponding pixel values of the digital image and the reference digital image to derive pixel values of the difference digital image. Next, at block 506, the difference digital image is stored at the first site. Next, at block 508, the difference digital image is transferred from the first site to a second site for processing.

Although specific embodiments of the invention have been described and illustrated, the invention is not to be limited to the specific forms or arrangements of parts so described and illustrated. As an example, the system 100 may be modified to include a communication network, wired or wireless, between the image acquisition units 104 and the central image processing unit 108 to directly transfer images from the image acquisition units to the central image processing unit, which would eliminate the need for the image collection units 106. The scope of the invention is to be defined by the claims appended hereto and their equivalents.

What is claimed is:

1. A system for collecting images of a monitored device, the system comprising:
   an image acquisition unit positioned to acquire digital images of the monitored device, the image acquisition unit comprising:
   an image sensor configured to electronically capture a digital image of the monitored device,
   a processor operatively coupled to the image sensor, the processor being configured: (1) to select respective ones of the acquired digital images, as reference digital images based on capture times of the acquired digital images such that each reference digital image and the remaining acquired digital images captured prior to a subsequent reference digital image form an image set, (2) to convert the remaining acquired digital images into difference digital images by processing, for each image set, the remaining acquired digital images of the respective image set with the reference digital image of the respective image set, the difference digital images having pixel values derived from differences between corresponding pixel values of the remaining acquired digital images and the corresponding reference digital image, and
   a data storage device operatively coupled to the processor to store the reference digital images and the corresponding difference digital image; and
   a data transfer device configured to receive the difference digital images and the corresponding reference digital images from the image acquisition unit and to transmit the difference digital images and corresponding reference digital images.

2. The system of claim 1, further comprising a central image processing unit, the central image processing unit being configured to receive the difference digital images and the corresponding reference digital images and to produce a reconstructed digital images from the difference digital images using the corresponding reference digital images, a respective reconstructed digital image having pixel values derived from differences between corresponding pixels of the difference digital image and the corresponding reference digital image.

3. The system of claim 1, wherein the monitored device is a utility meter, and the image acquisition unit is positioned to acquire digital images of the utility meter.

4. The system of claim 1, wherein the image acquisition unit is configured to capture the digital images of the monitored device at predefined times during a plurality of predefined periods of time.

5. The system of claim 4, wherein each reference digital image is a first digital image of the monitored device captured during the respective predefined period of time.

6. The system of claim 1, wherein the processor of the image acquisition unit is configured to compress the difference digital images using a selected compression standard.

7. The system of claim 6, wherein the processor of the image acquisition unit is configured to compress the difference digital images using a MPG4 compression standard.

8. A method for collecting images of a monitored device, the method comprising:
    electronically capturing digital images of the monitored device at a first site;
    selecting respective ones of the electronically captured digital images, as reference digital images based on capture times of the electronically captured digital images such that each reference digital image and the remaining electronically captured digital images captured prior to a subsequent reference digital image form an image set;
    processing the digital images at the first site to convert the remaining electronically captured digital images into difference digital images by processing, for each image set, the remaining electronically captured digital images of the respective image set with the reference digital image of the respective image set, the difference digital images, for each image set, having pixel values derived from differences, between corresponding pixel values of the electronically captured digital images of the respective image set and the reference digital image of the corresponding image set;
    storing the reference digital images and the corresponding difference digital images at the first site; and
    transferring the reference digital images and the corresponding difference digital images from the first site to a second site for processing.

9. The method of claim 8, further comprising:
    producing reconstructed digital images of the digital images at the second site from the difference digital images using the reference digital image of the corresponding image set, wherein the producing of the reconstructed digital images includes taking differences between corresponding pixels of each difference digital image and the reference digital image of the corresponding image set to derive pixel values of the reconstructed digital image.

10. The method of claim 8, wherein the transferring includes first transferring the difference digital images to an image collection unit and then transferring the difference digital image from the image collection unit to the second site.

11. The method of claim 8, wherein the electronically capturing includes electronically capturing the digital images of a utility meter.

12. The method of claim 8, wherein the electronically capturing of the digital images includes capturing the digital images at predefined times during a plurality of predefined periods of time at the first site.

13. The method of claim 12, wherein the reference digital images are first digital images of the monitored device captured during each respective predefined period of time.

14. The method of claim 8, further comprising:
    compressing the difference digital images using a selected compression standard at the first site.

15. The system of claim 14, wherein the compressing includes compressing the difference digital images using a MPG4 compression standard.

16. An image acquisition unit for reading a utility meter, the image acquisition unit comprising:
    an image sensor configured to electronically capture digital images of the utility meter;
    a processor operatively coupled to the image sensor, the processor being configured (1). to select respective ones of the captured digital images, as reference digital images based on capture times of the captured digital images such that each reference digital image and the remaining captured digital images captured prior to a subsequent reference digital image form an image set, and (2) to convert the remaining captured digital images into difference digital images by processing, for each image set, the remaining captured digital images of the respective image set with the reference digital image of the respective image set, the difference digital images having pixel values derived from differences between corresponding pixel values of the remaining captured digital images and the corresponding reference digital image, the difference digital images having pixel values derived from differences between corresponding pixels of the digital images and the reference digital image of the respective image set, the difference digital image being smaller in data size than the corresponding digital image; and
    a data storage device operatively coupled to the processor to store the reference digital images and the corresponding difference digital images.

17. The image acquisition unit of claim 16, wherein the processor is configured to control the image sensor to capture the digital images of the utility meter at predefined times during predefined periods of time.

18. The image acquisition unit of claim 17, wherein the reference digital images are first digital images of the utility meter captured during each respective predefined period of time.

19. The image acquisition unit of claim 16, wherein the processor is configured to compress the difference digital images using a MPG4 compression standard.

* * * * *

UNITED STATES PATENT AND TRADEMARK OFFICE
CERTIFICATE OF CORRECTION

PATENT NO. : 7,400,350 B2 Page 1 of 1
APPLICATION NO. : 11/031747
DATED : July 15, 2008
INVENTOR(S) : Butterworth It is certified that error appears in the above-identified patent and that said Letters Patent is hereby corrected as shown below:

In column 8, line 45, in Claim 1, after "difference digital" delete "image;" and insert -- images; --, therefor.

In column 8, line 54, in Claim 2, after "produce" delete "a".

In column 9, line 3, in Claim 5, after "during" delete "the" and insert -- a --, therefor.

In column 9, line 27, in Claim 8, after "differences" delete ",".

In column 10, line 19, in Claim 16, after "configured (1)" delete ".".

Signed and Sealed this

Seventh Day of October, 2008

JON W. DUDAS
*Director of the United States Patent and Trademark Office*